United States Patent
Wu

[11] Patent Number: 6,164,506
[45] Date of Patent: Dec. 26, 2000

[54] ADJUSTABLE SCOREBOARD MOUNTING ARRANGEMENT FOR A GOLF CART

[76] Inventor: David Wu, No. 35-1, Jih-Hsin Street, Tu Cheng City, Taipei Hsien, Taiwan

[21] Appl. No.: 09/428,552

[22] Filed: Oct. 28, 1999

[51] Int. Cl.[7] ................................................ B60R 9/00
[52] U.S. Cl. .................. 224/274; 224/277; 224/282; 224/553
[58] Field of Search ..................... 224/274, 401, 224/277, 282, 42.38, 545, 548, 553, 557, 564, 570, 571

[56] References Cited

U.S. PATENT DOCUMENTS

| | | | |
|---|---|---|---|
| 2,782,971 | 2/1957 | Hershey | 224/274 |
| 5,056,822 | 10/1991 | Shim | 224/277 X |
| 5,074,448 | 12/1991 | Wu | 224/274 |
| 5,310,155 | 5/1994 | Wu | 248/514 |
| 6,041,986 | 3/2000 | Wu | 224/274 |
| 6,059,158 | 5/2000 | Hsu | 224/274 |

*Primary Examiner*—Stephen K. Cronin
*Attorney, Agent, or Firm*—Varndell & Varndell, PLLC

[57] ABSTRACT

An adjustable scoreboard mounting arrangement, which includes a positioning block fastened to a hollow main rod member in a golf cart, a scoreboard detachably fastened to the positioning block, and a locking lever pivoted to a bottom stem at the scoreboard and turned between a horizontal position where the scoreboard is firmly maintanined engaged with the positioning block, and a vertical position where the scorebard is disengaged from the positioning block and allowed to be rotated with the locking lever to the desired angle.

3 Claims, 8 Drawing Sheets

ADJUSTABLE SCOREBOARD MOUNTING ARRANGEMENT FOR A GOLF CART

BACKGROUND AND SUMMARY OF THE INVENTION

The present invention relates to a golf cart, and more particularly to an adjustable scoreboard mounting arrangement for a golf cart, which allows the user to adjust the scoreboard horizontally to any of the desired angle.

Regular golf carts are commonly equipped with a scoreboard for posting scores. U.S. Pat. No. 5,074,448, which was issued to the present inventor, discloses a scoreboard for a golf cart that can be adjusted to the desired angle. However, this scoreboard mounting arrangement does not allow the user to adjust the scoreboard horizontally through 360°.

It is one object of the present invention to provide a scoreboard mounting arrangement, which has a simple structure and, can easily be installed. It is another object of the present invention to provide a scoreboard mounting arrangement, which can easily be adjusted horizontally to any of the desired angle. According to one aspect of the present invention, the adjustable scoreboard mounting arrangement comprises a positioning block fastened to a hollow main rod member in a golf cart, a scoreboard detachably fastened to the positioning block, and a locking lever pivoted to a bottom stem at the scoreboard and turned between a horizontal position where the scoreboard is firmly maintained engaged with the positioning block, and a vertical position where the scoreboard is disengaged from the positioning block and allowed to be rotated with the locking lever to the desired angle. According to another aspect of the present invention, the scoreboard comprises toothed annular flanges concentrically provided at the bottom sidewall thereof around the step for engagement with respective toothed annular flanges at the positioning block.

DETAILED DESCRIPTION OF THE PREFERRED EMBODIMENT

Figure 1:
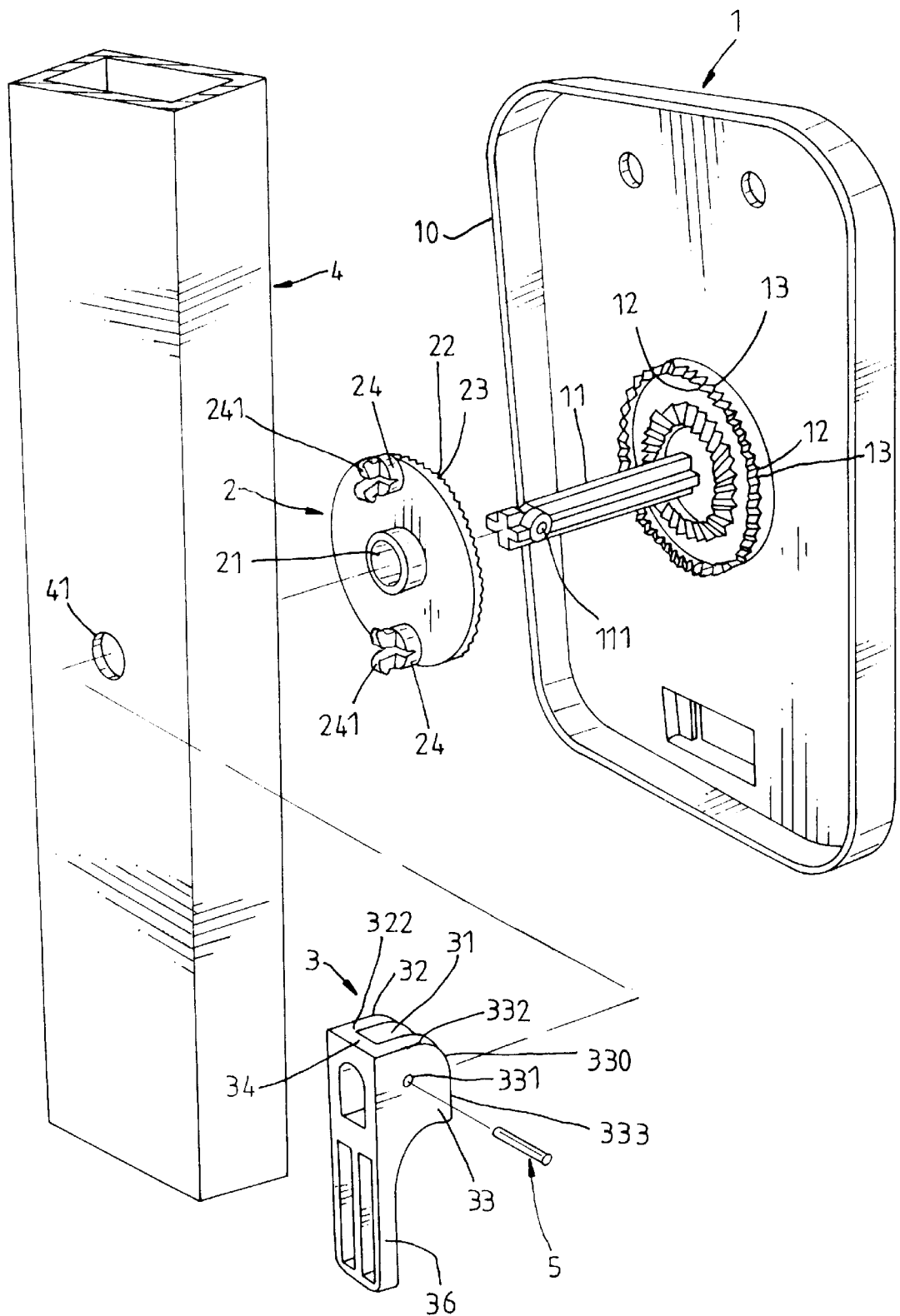
FIG. 1 is an exploded view of the present invention.

Referring to FIG. 1, an adjustable scoreboard mounting arrangement in accordance with the present invention is generally comprised of a scoreboard 1, a positioning block 2, locking lever 3, and a hollow main rod member 4.

Referring to FIG. 1 again, the scoreboard 1 comprises a body 10, a stem 11 perpendicularly extended from the bottom side wall of the body 10 at the center, and a plurality annular flanges 12 raised from the bottom side wall of teh body 10 and concentrically arranged around the stem 11.

The annular flanges 12 each define a series of teeth 13. The stem 11 has a transverse pivot hole 111 on the free end thereof. The positioning block 2 comprises a center through hole 21, a plurality of annular flanges 22 raied from the front side wall thereof and concentrically arranged around the center through hole 21, a plurality of locating flanges 24 symmetrically raised from the back side wall thereof, and a plurality of retaining rods 241 respectively raised from the locating flanges 24.

Figure 4:
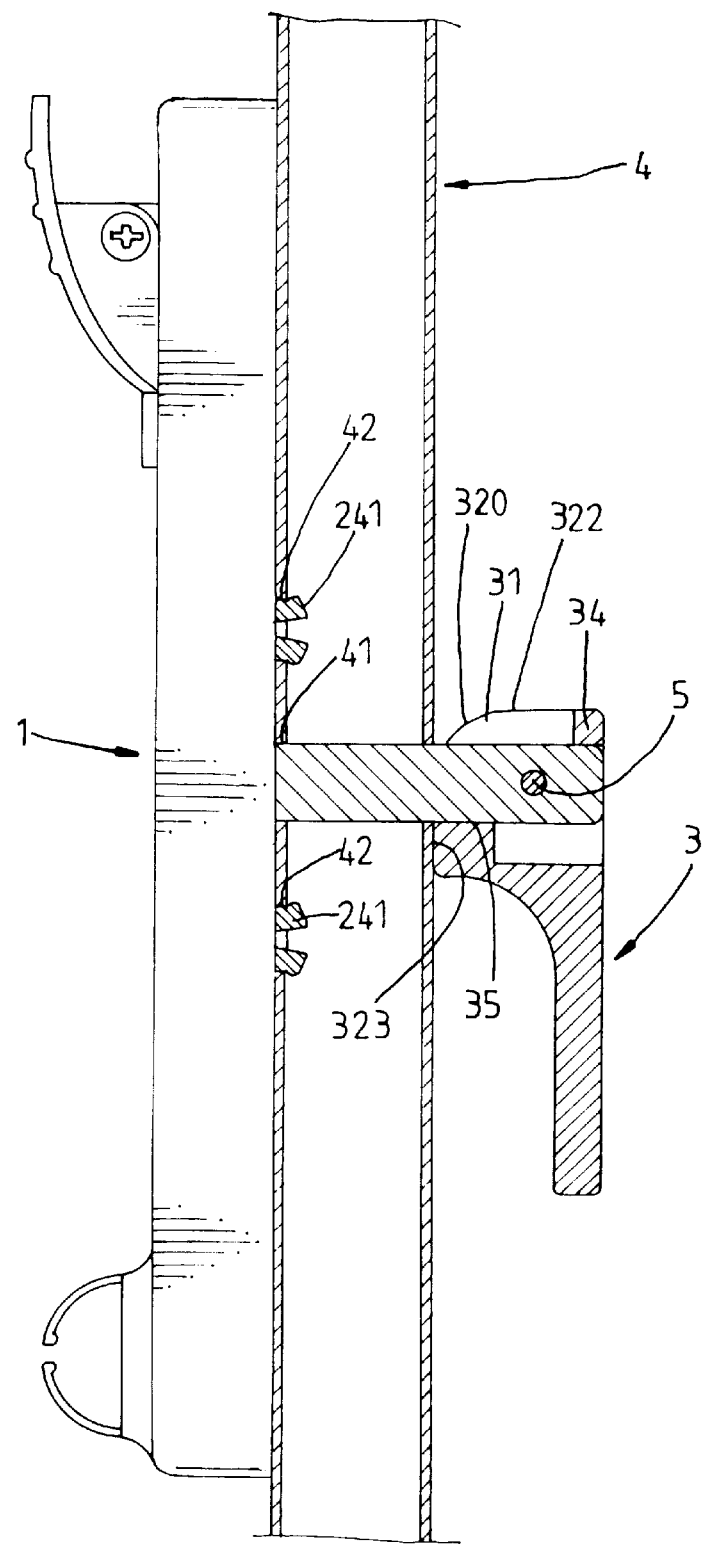
FIG. 4 is a side view in section of FIG. 2.
Figure 5:
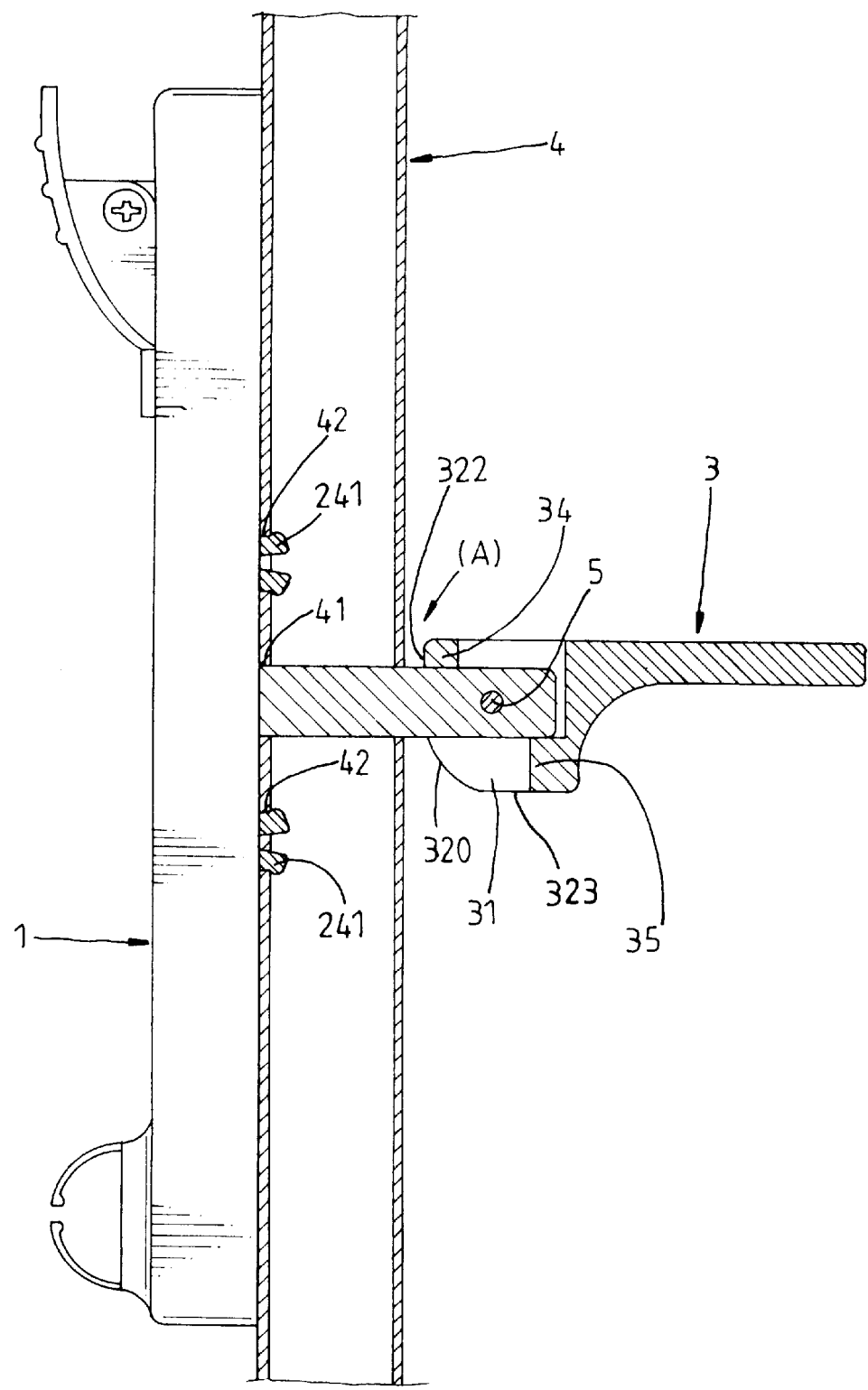
FIG. 5 is a side view in section of FIG. 3.
Figure 6:
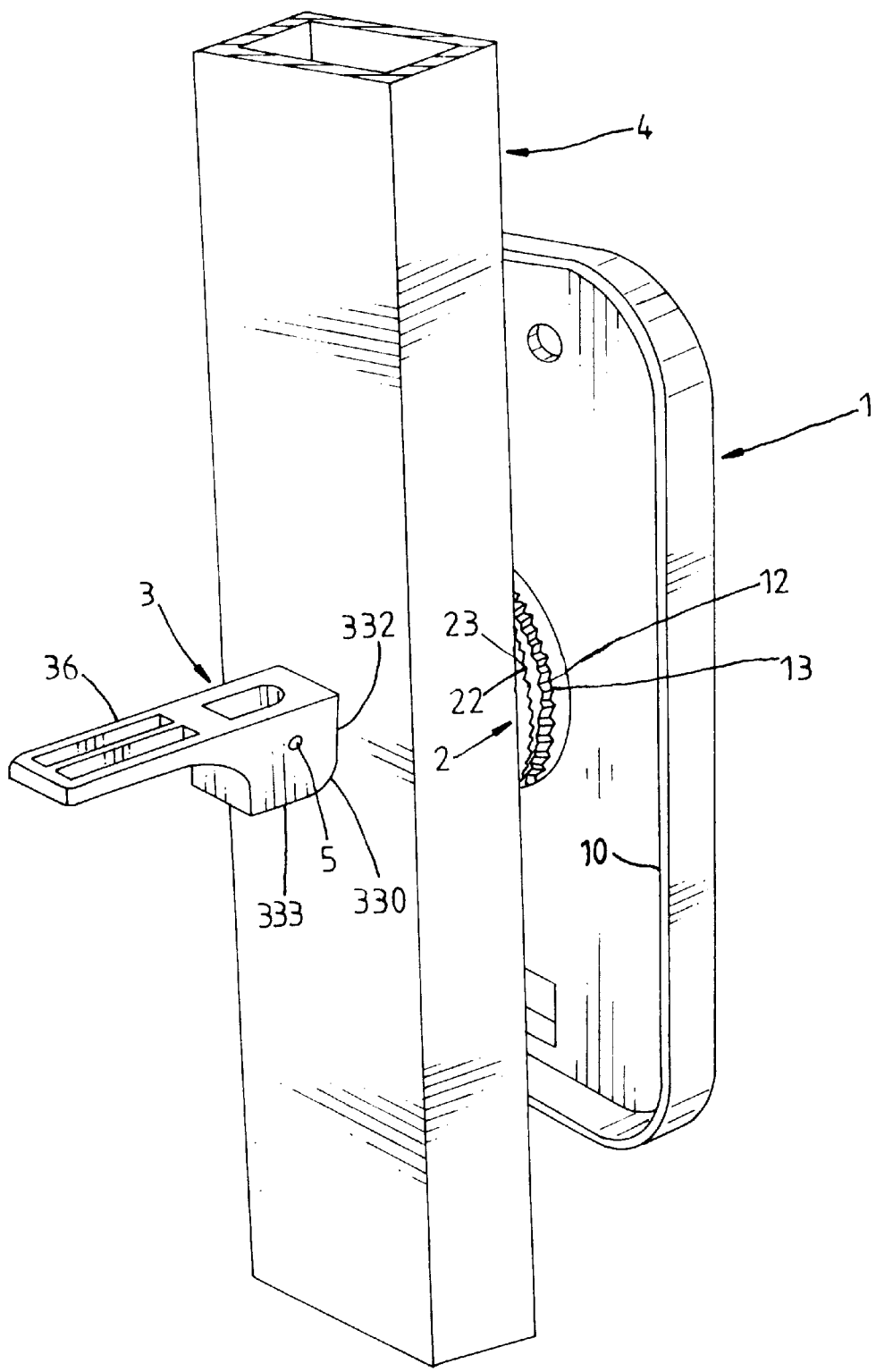
FIG. 6 similar to FIG. 3 but showing the scoreboard lifted, the teeth at the annular flanges at the body of the scoreboard disengaged from the teeth at the annular flange at the positioning block.
Figure 7:
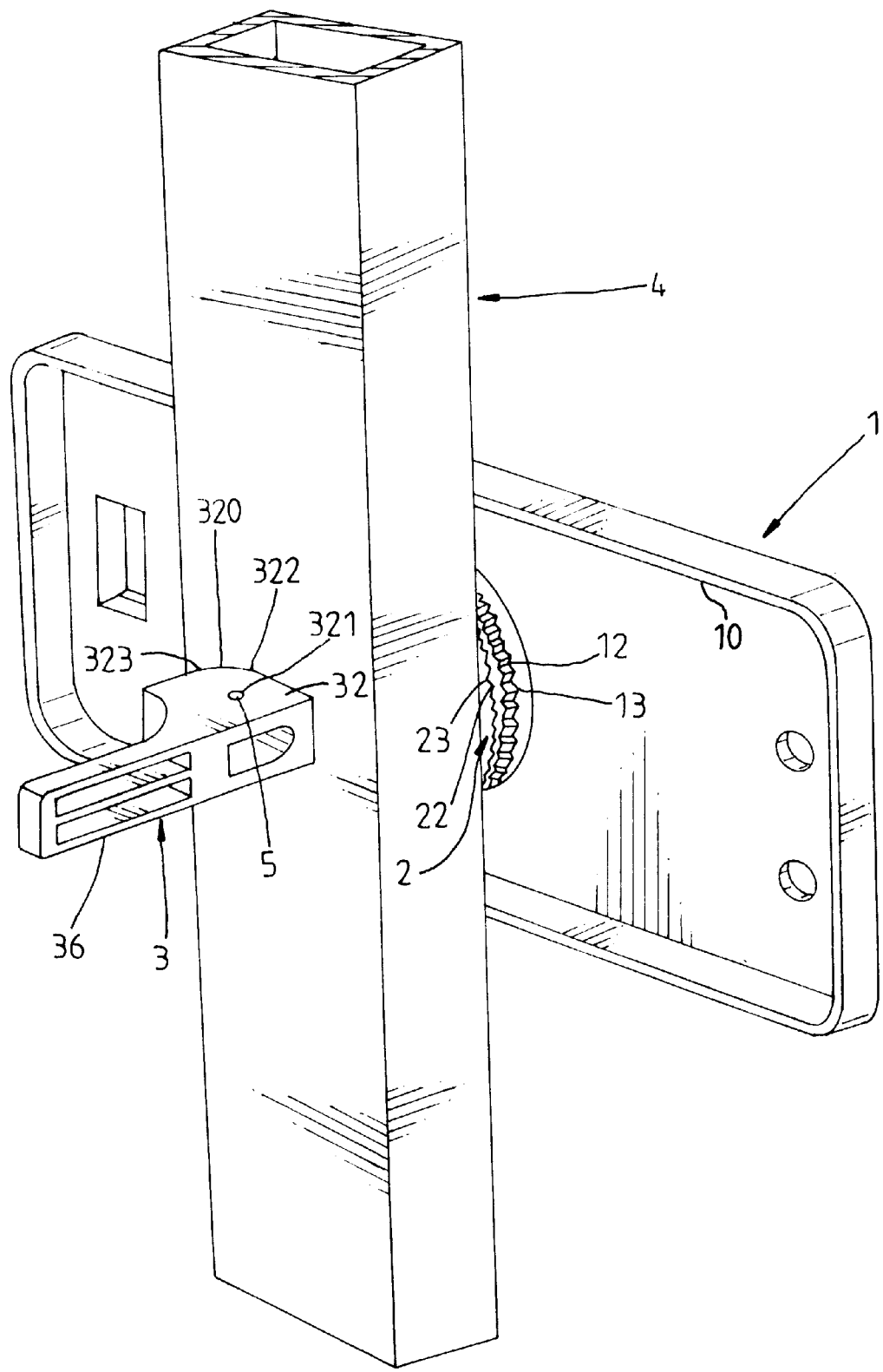
FIG. 7 is similar to FIG. 6 but showing the scoreboard rotated with the locking lever through 90°.
Figure 8:
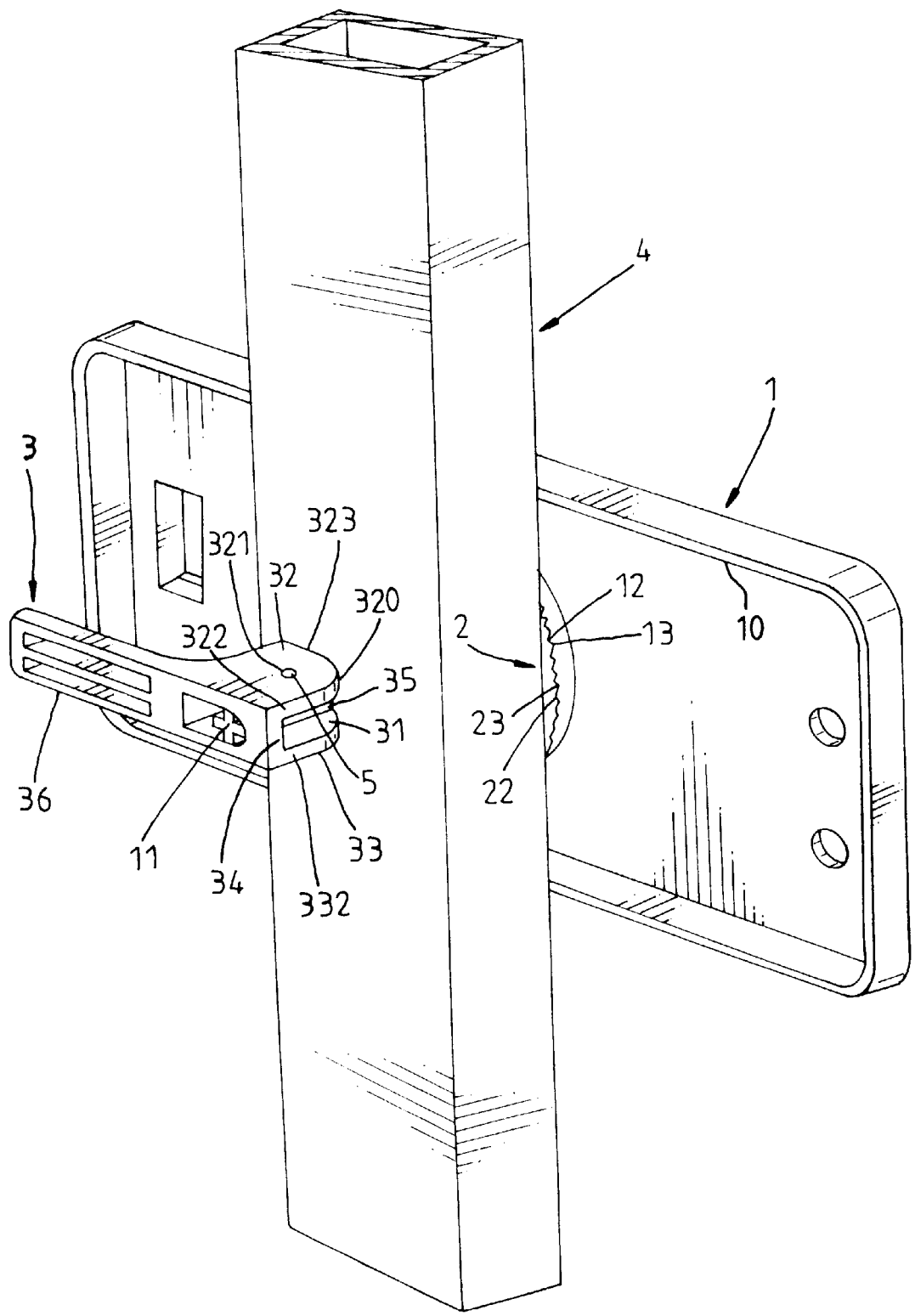
FIG. 8 is similar to FIG. 7 but showing the scoreboard engaged with the positioning block, the locking lever turned to the locking position.

Referring to FIG. 4 and FIG. 1 again, the annular flanges 22 each define a series of teeth 23. The locking lever 3 comprises a coupling block 34 at one end, namely, the front end thereof, and a handgrip 36 at ther other end, namely, the rear end thereof. The coupling block 34 comprises two parallel side walls 32 and 33, a receiving space 31 defined between the parallel side walls 32 and 33, a transverse stop wall 35 connected between the parallel side walls 32 and 33 above the receiving space 31, two pivot holes 331 respectively symmetrically formed on the parallel side walls 32 and 33. The parallel side walls 32 and 33 each have a front edge 322 or 332, a top edge 323 or 333, and a chamfered edge 320 or 330 connected between the front edge 322 or 332 and the top edge 323 or 333. The main rod member 4 comprises a through hole 41, which receives the stem 11 of the scoreboard 1, and two locating holes 42, which receive the locating flanges 24 of the positioning block 2.

Figure 2:
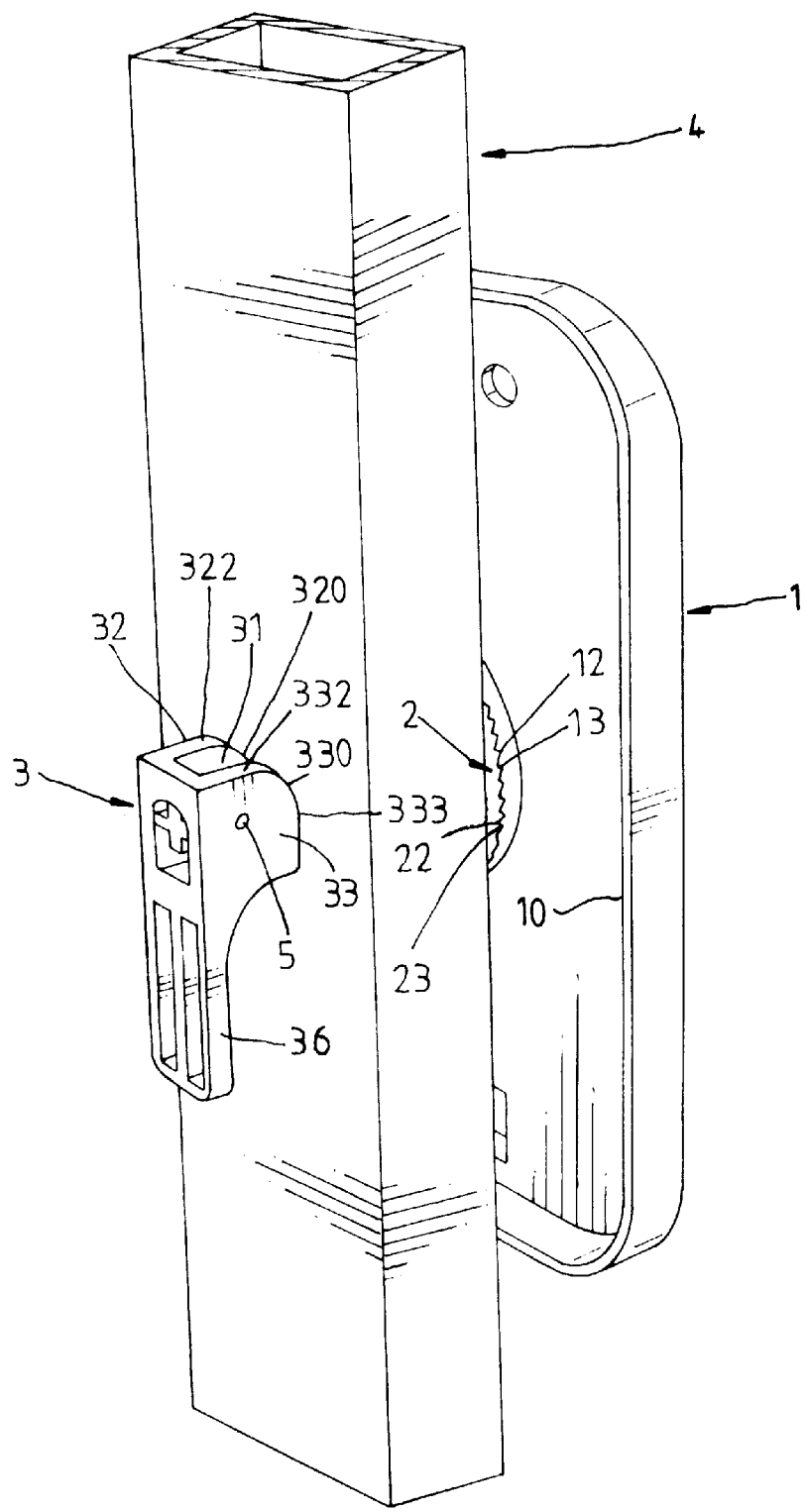
FIG. 2 is an assembly view of FIG. 1.
Figure 3:
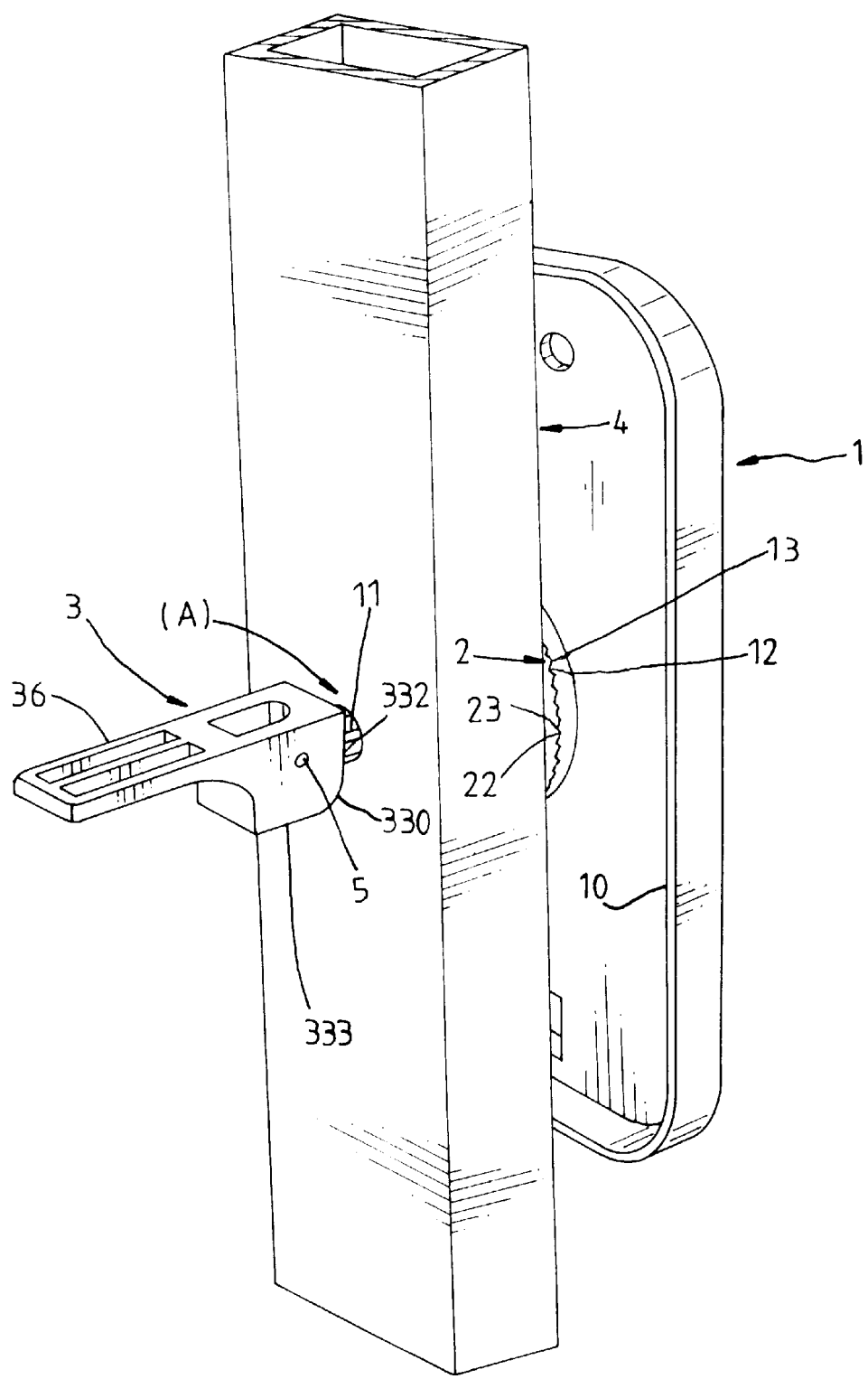
FIG. 3 is similar to FIG. 2 but showing the locking lever turned to the unlocking position.

The assembly process of the present invention is outlined hereinafter, with reference to FIGS. 2 and 3 and FIGS. 1 and 4 again. The locating flanges 24 of the positioning block 2 are respectively inserted into the locating holes 42 on the hollow main rod member 4, enabling the retaining rods 241 to be forced into engagement with the inside wall of the hollow main rod member 4, and then the stem 11 of the scoreboard 1 is inserted through the center through hole 21 on the positioning block 2 and the through hole 41 on the main rod member 4 into the receiving space 31 in the lever 3, and then a pivot 5 is fastened to the pivot holes 321 and 331 on the parallel side walls 32 and 33 of the lever 3 and the pivot hole 111 on the stem 11 of the scoreboard 1 to secure the scoreboard 1, the positioning block 2, the main rod member 4 and the lever 3 together, enabling the lever 3 to be turned about the axis, which passes axially through the pivot hole 111 on the stem 11 of the scoreboard 1, between a horizontal position, namely, the locking position (see FIG. 2) where the top edge 323 and 33 of the parallel side walls 32 and 33 of the lever 3 are respectively stopped against the outside wall of the hollow main rod member 4, and a vertical position, namely, the unlocking position (see FIG. 3) where the front edges 322 and 332 of the parallel side walls 32 and 33 of the lever 3 are respectively aimed at the outside wall of the hollow main rod member 4 and spaced from the outside wall of the hollow main rod member 4 at a distance A. Because the parallel side walls 32 and 33 have chamfered edges 320 and 330 connected between the respective front edge 322 and 332 and the respective top edge 323 and 333, the lever 3 can smoothly be turned between the locking position and the unlocking position.

Referring to FIGS. from 5 through 8, when the lever 3 is turned to the unlocking position, the front edges 322 and 332 of the parallel side walls 32 and 33 of the lever 3 are respectively aimed at the outside wall of the hollow main rod member 4 and spaced from the outside wall of the hollow main rod member 4 at a distance A, enabling the scoreboard 1 to be lifted from the positioning block 2 and the hollow main rod member 4 to disengage the teeth 13 at the annular flanges 12 thereof from the teeth 23 at the positioning block 2. After disengagement of the teeth 13 at the scoreboard 1 from the teeth 23 at the positioning block 2, the scoreboard 1 is rotated with the lever 3 to the desired angle, and then the lever 3 is turned to the locking position to lock the scoreboard 1 in position.

The body 10 of the scoreboard, the positioning block 2, and the lever 3 can be respectively injection-molded from plastic to minimize the manufacturing cost. Further, the teeth 13 and 23 preferably slope in one direction, so that the scoreboard 1 can quickly be positioned on the positioning block 2.

As indicated above, the assembly process of the present invention is simple. The assembly process is completed simply by: inserting the locating flanges 24 of the positioning block 2 into the locating holes 42 on the hollow main rod member 4, then inserting the stem 11 of the scoreboard I through the center through hole 21 on the positioning block 2 into the receiving space 31 in the lever 3, and then fastening the pivot 5 to the pivot holes 321 and 331 on the lever 3 and the pivot hole 111 on the stem 11 of the scoreboard 1.

What is claimed is:

1. An adjustable scoreboard mounting arrangement comprising:

a hollow main rod member for a golf cart, said hollow main rod member comprising a through hole and two locating holes equally spaced from the through holes at two opposite sides;

a positioning block mounted on said hollow main rod member, said positioning block comprising a center through hole aimed at the through hole on said hollow main rod member, a plurality of annular flanges raised from a front side wall thereof and concentrically arranged around the center through hole thereof, a plurality of locating flanges symmetrically raised from a back side wall thereof and respectively inserted into the locating holes on said hollow main rod member, and a plurality of retaining rods respectively raised from said locating flanges engaged with an inside wall of said hollow main rod member, the annular flanges of said positioning block each defining a series of teeth;

a scoreboard supported on said positioning block above said hollow main rod member, said scoreboard comprising a body having a bottom side wall, a stem perpendicularly extended from the bottom side wall of said body at the center and inserted through the center through hole on said positioning block and the through hole on said hollow amin rod member, and a plurality annular flanges raised from the bottom side wall of said body and concentrically arranged around said stem, the annular flanges of the body of said scoreboard each defining a series of teeth for engagement with the teeth at the annular flanges of said positioning block to hold said scoreboard on said positioning block; and a locking lever pivoted to the stem of said scoreboard at one side of said hollow main rod member opposite to said positioning block and turned between a horizontal position where the teeth at the annular flanges of said scoreboard are engaged with the teeth at the annular flanges of said positioning block, and a vertical position where the teeth at the annular flange of said scoreboard are allowed to be disengaged from the teeth at the annular flanges of said positioning block for enabling said scoreboard to be rotated with said lever relative to said positioning block and said hollow main rod member to the desired angle, said locking lever comprising a coupling block at a front end thereof pivoted to the stem of said scoreboard and a hand grip at a rear end thereof, said coupling block comprising two parallel side walls, a receiving space defined between said parallel side walls, which receives the stem of said scoreboard, a transverse stop wall connected between said parallel side walls above said receiving space, two pivot holes respectively symmetrically formed on said parallel side walls and connected to the pivot hole on the stem of said scoreboard at two opposite sides by a pivot, said parallel side walls each having a top edge, which is stopped against said hollow main rod member when said locking lever is turned to said horizontal positon, and a front edge, which faces said hollow main rod member when said locking lever is turned to said vertical position.

2. The adjustable scoreboard mounting arrangement of claim 1 wherein the parallel side walls of said locking lever each comprise a chamfered edge connected between the respective front edge and the respective top edge.

3. The adjustable scoreboard mounting arrangement of claim 1 wherein the teeth on the annular flanges of said scoreboard and the teeth on the annular flanges of said positioning block respectively slope in one direction.

* * * * *